(12) United States Patent
Harrison

(10) Patent No.: US 9,431,922 B2
(45) Date of Patent: Aug. 30, 2016

(54) ARC FAULT PROTECTION FOR POWER CONVERSION

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 132 days.

(21) Appl. No.: 14/505,725

(22) Filed: Oct. 3, 2014

(65) Prior Publication Data

US 2015/0098251 A1    Apr. 9, 2015

Related U.S. Application Data

(60) Provisional application No. 61/886,375, filed on Oct. 3, 2013.

(51) Int. Cl.
| | |
|---|---|
| *H02M 3/335* | (2006.01) |
| *H02M 7/44* | (2006.01) |
| *H02J 3/38* | (2006.01) |
| *H02M 7/48* | (2007.01) |

(52) U.S. Cl.
CPC ............. *H02M 7/44* (2013.01); *H02J 3/383* (2013.01); *H02M 3/33592* (2013.01); *H02M 7/4807* (2013.01); *H02M 2007/4815* (2013.01); *Y02B 70/1441* (2013.01); *Y02E 10/563* (2013.01); *Y10T 307/50* (2015.04)

(58) Field of Classification Search
CPC ........... H02M 3/335; H02M 3/33592; H02M 2007/4815; H02M 7/44; H02M 7/4807; H02J 3/383
See application file for complete search history.

(56) References Cited

U.S. PATENT DOCUMENTS

| | | |
|---|---|---|
| 6,198,178 B1 | 3/2001 | Schienbein et al. |
| 7,009,859 B2 | 3/2006 | Chen et al. |

(Continued)

FOREIGN PATENT DOCUMENTS

| | | |
|---|---|---|
| JP | 2012112937 A | 6/2012 |
| JP | 2013132157 A | 7/2013 |

OTHER PUBLICATIONS

Sivakumar et al., "Control of Hybrid System Using Multi-Input Inverter and Maximum Power Point Tracking", International Journal of Engineering Research and Applications, vol. 3, Issue 4, pp. 77-81, 2013.

(Continued)

*Primary Examiner* — Matthew Nguyen
(74) *Attorney, Agent, or Firm* — Moser Taboada

(57) ABSTRACT

An apparatus and system for arc fault protection during power conversion. In one embodiment, the apparatus comprises a power converter comprising a first and a second pair of DC input terminals, coupled in series, for coupling to a first and a second DC source, respectively; an input bridge; an inductor; a first and a second arc fault protection capacitor, wherein (i) the series combination of the first and the second pair of DC input terminals is coupled across the input bridge, (ii) a first terminal of the inductor is coupled between the first and the second pair of DC input terminals, (iii) a second terminal of the inductor is coupled between switches on one leg of the input bridge, and (iv) the first and the second arc fault protection capacitors are coupled across the first and the second pair of DC input terminals, respectively.

20 Claims, 3 Drawing Sheets

(56) References Cited

U.S. PATENT DOCUMENTS

| | | | |
|---|---|---|---|
| 7,099,169 B2 | 8/2006 | West et al. | |
| 7,136,294 B2 * | 11/2006 | Phadke | H02M 1/34 363/132 |
| 8,212,409 B2 | 7/2012 | Bettenwort et al. | |
| 8,526,205 B2 | 9/2013 | Garrity | |
| 8,638,581 B2 | 1/2014 | Zacharias et al. | |
| 8,953,352 B2 * | 2/2015 | Krause | H02M 3/1584 323/271 |
| 2012/0112550 A1 | 5/2012 | Schill | |
| 2012/0313443 A1 | 12/2012 | Cheng et al. | |
| 2013/0002031 A1 | 1/2013 | Mulkey et al. | |
| 2013/0043733 A1 | 2/2013 | Frolov et al. | |
| 2013/0092208 A1 | 4/2013 | Robbins | |
| 2013/0194706 A1 | 8/2013 | Har-Shai et al. | |
| 2014/0062500 A1 | 3/2014 | Behrends et al. | |
| 2014/0063885 A1 * | 3/2014 | Itoh | H02M 7/487 363/132 |
| 2014/0140114 A1 * | 5/2014 | Shoji | H02M 7/53871 363/89 |

OTHER PUBLICATIONS

Shen et al., "Multi-Input Converter with MPPT Feature for Wind-PV Power Generation System", International Journal of Photoenergy, pp. 1-14, Jan. 2013.

PCT Search Report and Written Opinion, PCT/US2014/058980, 10 pages, Date of mailing Dec. 22, 2014.

* cited by examiner

ARC FAULT PROTECTION FOR POWER CONVERSION

CROSS-REFERENCE TO RELATED APPLICATION

This application claims priority to U.S. Provisional Patent Application No. 61/886,375 filed on Oct. 3, 2013, which is herein incorporated in its entirety by reference.

BACKGROUND OF THE INVENTION

1. Field of the Invention

Embodiments of the present disclosure relate generally to power conversion, and, in particular, to arc fault protection during power conversion.

2. Description of the Related Art

Power converters are often used in power generation for distributed generators such as photovoltaic (PV) panels or modules that produce DC voltage. The PV modules are conventionally connected in series which creates a high enough voltage potential to be able to sustain an electrical arc should the DC current be interrupted by virtue of a faulty connector or wire conductor. An arc of this type has the potential to start a fire in the DC circuit wiring that could spread to other parts of the system or the building that the PV system is installed upon. Safety legislation stipulates that if the total DC voltage generated by a series string of PV modules exceed 80 volts then some form of arc detection and protection circuitry needs to be added to the converter in order to protect the system from any potential arc that could cause a fire in the DC circuit.

Therefore, there is a need in the art for efficient arc fault protection during power conversion.

SUMMARY OF THE INVENTION

Embodiments of the present invention generally relate to arc fault protection during power conversion substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
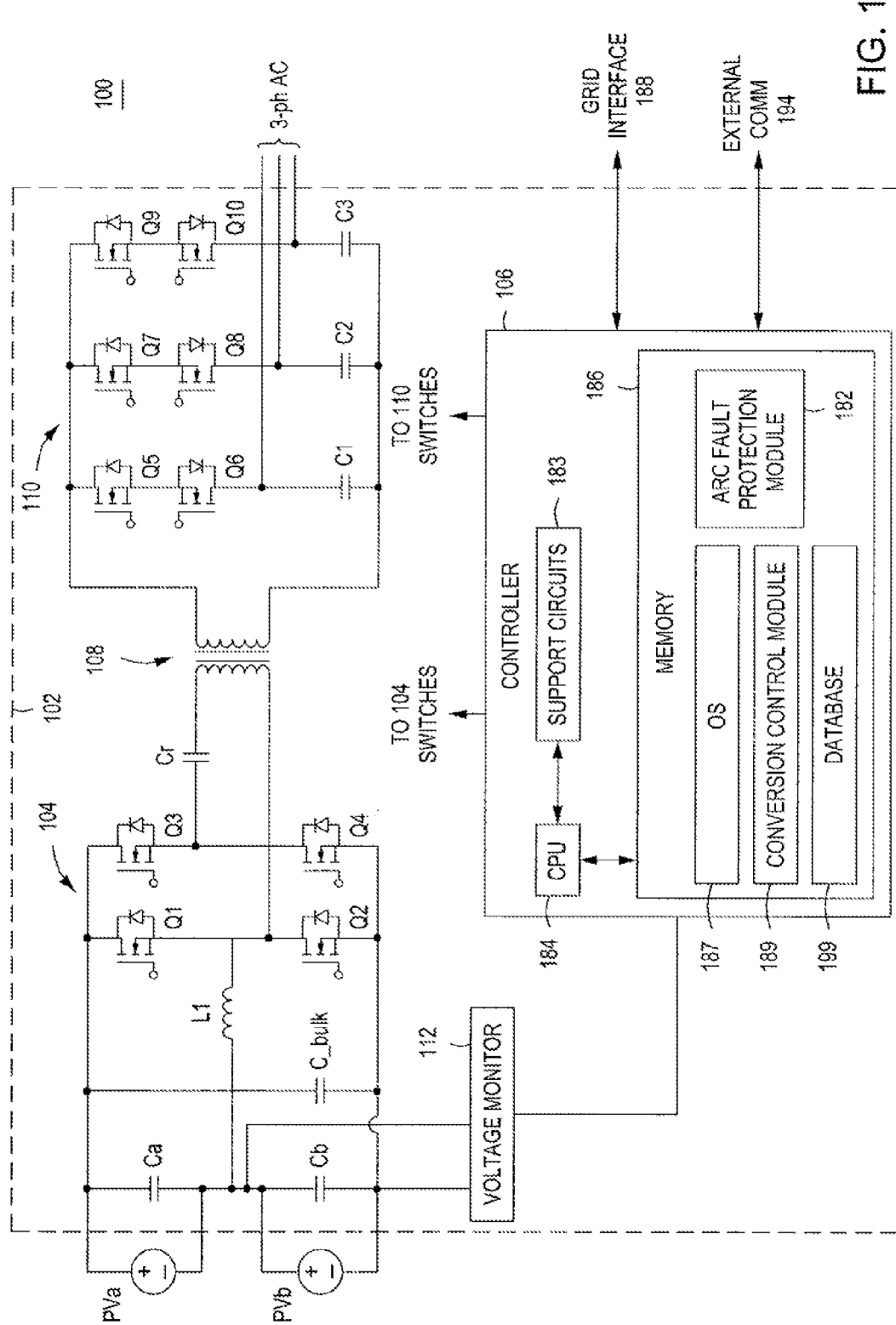
FIG. 1 is a schematic diagram of a power conversion system comprising an inverter in accordance with one or more embodiments of the present invention.

FIG. 1 is a schematic diagram of a power conversion system 100 comprising an inverter 102 in accordance with one or more embodiments of the present invention. This diagram only portrays one variation of the myriad of possible system configurations. The present invention can function in a variety of power generation environments and systems.

The power conversion system 100 comprises a photovoltaic (PV) module PVa coupled to a first pair of DC input terminals of the dual-input inverter 102 and a PV module PVb coupled to a second pair of DC input terminals of the dual-input inverter 102 such that the PV modules PVa and PVb are coupled in series. In one or more alternative embodiments other types of DC voltage sources, such as other types of renewable energy sources (e.g., wind farms, hydroelectric systems, and the like), batteries, and the like, may be additionally or alternatively be used.

The inverter 102 comprises arc fault protection capacitors Ca and Cb (referred to as "capacitors Ca and Cb") coupled across the PV modules PVa and PVb, respectively. The capacitors Ca and Cb are each suitably sized to provide arc fault protection in the event of a break in a DC connection between the inverter 102 and the PV modules PVa and PVb. In the event of such a break, for example due to a faulty connector or a break in a wire, the capacitors Ca and Cb isolate the two PV modules PVa and PVb from creating the necessary high voltage potential that would result in an arc fault. For example, if an output wire from the PV module PVa experiences a break, the capacitor Cb prevents the output from the PV module PVb from feeding any arc that might be created by the PV module PVa; i.e., current flowing from the PV module PVb will flow through capacitor Ca rather than toward the higher impedance break. Although the capacitors Ca and Cb are depicted in FIG. 1 as within the inverter 102, in other embodiments the capacitors Ca and Cb may be coupled across the PV modules PVa and PVb, respectively, external to the inverter 102. For example, the capacitors Ca and Cb may be coupled directly across the PV modules PVa and PVb, respectively, within the corresponding PV module junction boxes to provide inherent arc fault protection for the PV modules.

The size of the capacitors Ca and Cb may be determined based on an amount of inherent inductance expected in the circuit between the PV modules and the inverter 102 as well as an expected amount of current. By suitably sizing Ca and Cb, an arc can be prevented from forming when a break in the DC circuit between the PV modules and the inverter 102 occurs. Generally, the capacitors Ca and Cb would each be on the order of tens to hundreds of nanofarads.

The inverter 102 further comprises a voltage monitor 112 coupled across the PV module PVb to sample (i.e., measure) the voltage at the midpoint of the inverter input. The voltage monitor 112 generates values indicative of the sampled midpoint voltage and couples such samples to a controller 106 described below. In some embodiments, the voltage monitor 112 may perform such sampling at a rate of, for example, 30 kHz. In some embodiments, the voltage monitor 112 comprises an analog-to-digital converter (ADC) for generating the samples in a digital format.

A capacitor C_bulk is coupled across the series combination of the capacitors Ca and Cb, as well as across an H-bridge 104 formed from switches Q1, Q2, Q3 and Q4. The switches Q1 and Q2 are coupled in series to form a left leg of the H-bridge 104, and the switches Q3 and Q4 are coupled in series to form a right leg of the H-bridge 104. An inductor L1 is coupled between the midpoint of the PV modules PVa and PVb (i.e., between the PV modules PVa and PVb) and a midpoint of the H-bridge left leg (i.e., between switches Q1 and Q2).

The output of the H-bridge 104 is coupled across a series combination of a capacitor Cr and the primary winding of a transformer 108. The secondary winding of the transformer 108 is coupled across a cycloconverter 110 which produces a three-phase AC output, although in other embodiments the cycloconverter 110 may produce one or two phases of AC at its output. The cycloconverter 110 comprises a first leg, a second leg, and a third leg coupled in parallel to one another. The first cycloconverter leg comprises a series combination of a switch Q5, a switch Q6, and a capacitor C1. The second cycloconverter leg comprises a series combination of a switch Q7, a switch Q8, and a capacitor C2. The third cycloconverter leg comprises a series combination of a switch Q9, a switch Q10, and a capacitor C3. A first AC output phase line is coupled between the switch Q6 and the capacitor C1, a second AC output phase line is coupled between the switch Q8 and the capacitor C2, and a third AC output phase line is coupled between the switch Q10 and the capacitor C3. In some embodiments, the inverter 102 may include additional circuitry not shown, such as voltage and/or current monitors, for obtaining data for power conversion, data reporting, and the like.

The inverter 102 additionally comprises the controller 106 coupled to the voltage monitor 112, the H-bridge switches Q1, Q2, Q3 and Q4, and the cycloconverter switches Q5, Q6, Q7, Q8, Q9, and Q10. The controller 106 comprises a CPU 184 coupled to each of support circuits 183 and a memory 186. The CPU 184 may comprise one or more conventionally available microprocessors or microcontrollers; additionally or alternatively, the CPU 184 may include one or more application specific integrated circuits (ASICs). The support circuits 183 are well known circuits used to promote functionality of the CPU 184. Such circuits include, but are not limited to, a cache, power supplies, clock circuits, buses, input/output (I/O) circuits, and the like. The controller 106 may be implemented using a general purpose computer that, when executing particular software, becomes a specific purpose computer for performing various embodiments of the present invention.

The memory 186 may comprise random access memory, read only memory, removable disk memory, flash memory, and various combinations of these types of memory. The memory 186 is sometimes referred to as main memory and may, in part, be used as cache memory or buffer memory. The memory 186 generally stores the operating system (OS) 187, if necessary, of the controller 106 that can be supported by the CPU capabilities. In some embodiments, the OS 187 may be one of a number of commercially available operating systems such as, but not limited to, LINUX, Real-Time Operating System (RTOS), and the like.

The memory 186 may store various forms of application software, such as a conversion control module 189 for controlling power conversion by the inverter 102 (e.g., maximum power point tracking (MPPT), switching, and the like) and an arc fault protection module 182 for providing protection from arcs as described below. The memory 186 may further store a database 199 for storing various data, such as an arc fault signature for use in arc fault protection. The controller 106 further processes inputs and outputs to external communications 194 (i.e., gateway) and a grid interface 188.

During operation of the inverter 102, the diagonals of the H-bridge 104 (i.e., the switches Q1/Q4 and Q2/Q3) are alternately activated and deactivated to generate a bipolar square wave output from the H-bridge 104. The average voltage at the midpoint of the H-bridge left leg (i.e., between the switches Q1 and Q2) is equal to the total inverter input voltage multiplied by $Q1_{ON}/(Q1_{ON}+Q2_{ON})$, where $Q1_{ON}$ and $Q2_{ON}$ are the ON-times for the switches Q1 and Q2, respectively, during a switching cycle. By adjusting the amount of ON-time apportioned to the switches Q1 and Q2 (and therefore the amount of ON-time apportioned to each diagonal) during a switching cycle, the average midpoint voltage of the H-bridge left leg can be biased to assume a desired voltage. For example, if the switch Q1 remains ON for half as long as the switch Q2 during each switching cycle, the average midpoint voltage of the H-bridge left leg would be biased at ⅓ of the total inverter input voltage. Alternatively, if the switch Q1 remains ON twice for twice as long as the switch Q2 during each switching cycle, the average midpoint voltage of the H-bridge left leg would be biased at ⅔ of the total inverter input voltage.

The inductor L1 along with the capacitors Ca and Cb form a filter 114 which forces the voltage at the midpoint between the PV modules PVa and PVb to be equal to the average midpoint voltage of the H-bridge left leg, thereby driving the ratio of the PV module voltages Va/Vb to be equal to the ratio of the switch Q1 and the switch Q2ON-times $Q2_{ON}/Q1_{ON}$ (assuming no losses). As such, by adjusting the relative ON-time ratio (i.e., the duty cycle ratio) of the switches Q1 and Q2, the ratio of the input voltages from the PV modules PVa and PVb can be controlled. Such control can be used to provide independent maximum power point tracking (MPPT) for each of the PV modules PVa and PVb.

In accordance with one or more embodiments of the present invention, two independent mechanisms provide arc fault protection by working to prevent an arc. The first mechanism comprises the action of the capacitors Ca and Cb providing a decoupling mechanism such that an arc generated on one of the PV modules PVa or PVb is contained to its respective capacitor and the other PV module can't contribute to the applied arc voltage (as described above). The second mechanism comprises the action of the inductor L1 which forces the voltage at the junction of the PV modules PVa and PVb to be in proportion to the duty cycle ratio of the switches Q1 and Q2 (as described above). Such operation isolates any initial arcing generated on one of the PV modules PVa or PVb such that the other PV module (i.e., the PV module not having an arc) cannot contribute voltage to help establish an arc.

Further, in addition to these two inherent techniques to prevent an arc, the voltage monitor 112 monitors for a unique signature of an arc (i.e., an arc fault signature) which would appear as a sudden change in voltage at the midpoint junction of the PV modules PVa and PVb. The rate of change of the midpoint voltage can be calculated by the equation i/C=dv/dt, where i represents the output current of the PV module and C represents the capacitors Ca and Cb. In typical embodiments, dv/dt may be calculated using typical values to be on the order of 100V/µs, representing a rate of change of voltage that would be over a million times greater than the expected dv/dt that would result from normal irradiance changes and hence can be very easily distinguished from normal irradiance induced changes. If a unique signature is observed, the controller 106 commands the inverter 102 to stop drawing power from the PV modules PVa and PVb, thereby extinguishing the arc. Thus, one active and two inherent arc fault mechanisms operate to prevent or extinguish any arcs.

In some alternative embodiments, the arc fault protection technique described above may be employed in a power converter having more than two DC inputs.

Figure 2:
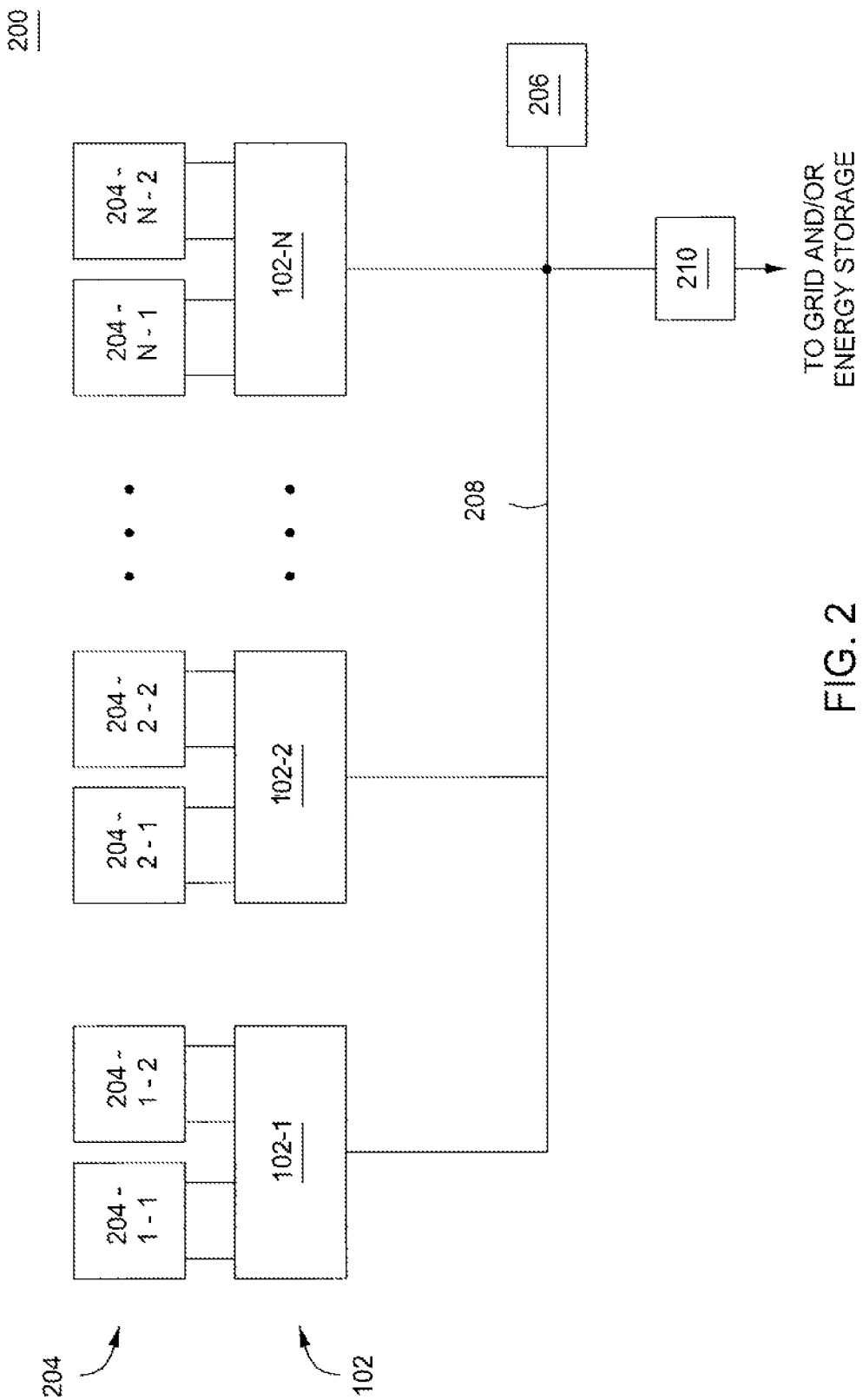
FIG. 2 is a block diagram of a power conversion system utilizing arc fault protection in accordance with one or more embodiments of the present invention.

FIG. 2 is a block diagram of a power conversion system 200 utilizing arc fault protection in accordance with one or more embodiments of the present invention. This diagram only portrays one variation of the myriad of possible system configurations and devices that may utilize the present invention. The present invention can be utilized in many different systems or devices for providing arc fault protection.

The system 200 comprises a plurality of inverters 102-1, 102-2 . . . 102-N, collectively referred to as inverters 102. Each inverter 102 comprises a first pair of DC input terminals serially coupled to a second pair of DC input terminals for coupling to two DC sources 204—i.e., the inverter 102-1 is coupled to the DC sources 204-1-1 and 204-1-2; the inverter 102-2 is coupled to the DC sources 204-2-1 and 204-2-2; and the inverter 102-N is coupled to the DC sources 204-N-1 and 204-N-2. The DC sources 204 and the inverters 102 form a distributed generator (DG) where the DC sources 204 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

The inverters 102 are further coupled to a system controller 206 via an AC bus 208, and a load center 210 is also coupled to the AC bus 208. The system controller 206 is capable of communicating with the inverters 102 by wireless and/or wired communication (e.g., power line communications) for providing operative control of the inverters 102 and/or receiving data from the inverters 102. In some embodiments, the system controller 206 may be a gateway that receives data from the inverters 102 and communicates the data to another system, e.g., via the Internet.

The inverters 102 each convert the received DC power to AC power as previously described with respect to FIG. 1, although in other embodiments the inverters 102 may be other types of power converters such as DC-AC inverters that generate single-phase or split-phase (e.g., two-phase) AC power. The inverters 102 couple the generated output power to the load center 210 via the bus 208. The generated power may then be distributed for use, for example to one or more appliances, and/or the generated energy may be stored for later use, for example using batteries, heated water, hydro pumping, $H_2O$-to-hydrogen conversion, or the like. In some embodiments, the inverters 102 convert the DC input power to AC power that is commercial power grid compliant and couple the AC power to the commercial power grid via the load center 210.

In some alternative embodiments, the inverters 102 may be DC-DC power converters. In other alternative embodiments, the inverters 102 may receive an AC input and be AC-AC converters (e.g., AC-AC matrix converters). In still other alternative embodiments, the inverters 102 may convert received AC power to a DC output.

In accordance with one or more embodiments of the present invention, each of the inverters 102 comprises the filter 114 (i.e., a first arc fault protection capacitor Ca coupled across one of the corresponding DC sources 204 and a second arc fault protection capacitor Cb coupled across the other corresponding DC source 204, as well as the inductor L1 as previously described). As previously described, each of the capacitors Ca and Cb are suitably sized to provide arc fault protection in the event of a break in a DC connection between the inverter 102 and the corresponding DC sources 204 by isolating the DC sources 204 from creating the necessary high voltage potential that would result in an arc fault. Generally, the capacitors Ca and Cb would each be on the order of tens to hundreds of nanofarads. Additionally, as previously described, at each inverter 102 the action of the inductor L1 results in isolating any initial arcing generated on one of the corresponding DC sources 204 such that the other DC source 204 (i.e., the DC source 204 not having an arc) cannot contribute voltage to help establish an arc.

Further, each of the inverters 102 comprises the voltage monitor 112/controller 106 for monitoring for a unique arc fault signature as previously described and commanding the inverter 102 to stop drawing power from the corresponding DC sources 204 if the arc fault signature is detected.

In some alternative embodiments, the arc fault protection capacitors Ca and Cb may be located externally to the inverters 102. In some such embodiments, the arc fault protection capacitors Ca and Cb may be coupled across the corresponding DC sources 204-1 and 204-2, respectively, at the input to the inverter 102. In other embodiments, the arc fault protection capacitors Ca and Cb may be coupled directly across the DC sources 204-1 and 204-2, respectively, at the DC sources 204. For example, in one or more embodiments where the DC sources 204 are PV modules, the arc fault protection capacitors Ca and Cb may be coupled across the PV modules within the corresponding PV module junction boxes to provide inherent arc fault protection for the PV modules.

In certain alternative embodiments, the plurality of inverters 102 in the system 200 may be replaced by a single centralized power converter (e.g., a DC-AC inverter, a DC-DC converter, or other type of power converter) coupled to a plurality of DC sources 204 (e.g., a centralized power converter coupled to a plurality of PV modules in a PV array). In other alternative embodiments, the inverters 102 may be string-type power converters (e.g., string inverters) that are each coupled to a plurality of DC source strings (e.g., PV module strings). In each of such embodiments, arc fault protection is employed as described herein (e.g., fully within the power converters 202 or as a combination within the power converters and at the DC sources 204 as previously described) for providing arc fault protection.

Figure 3:
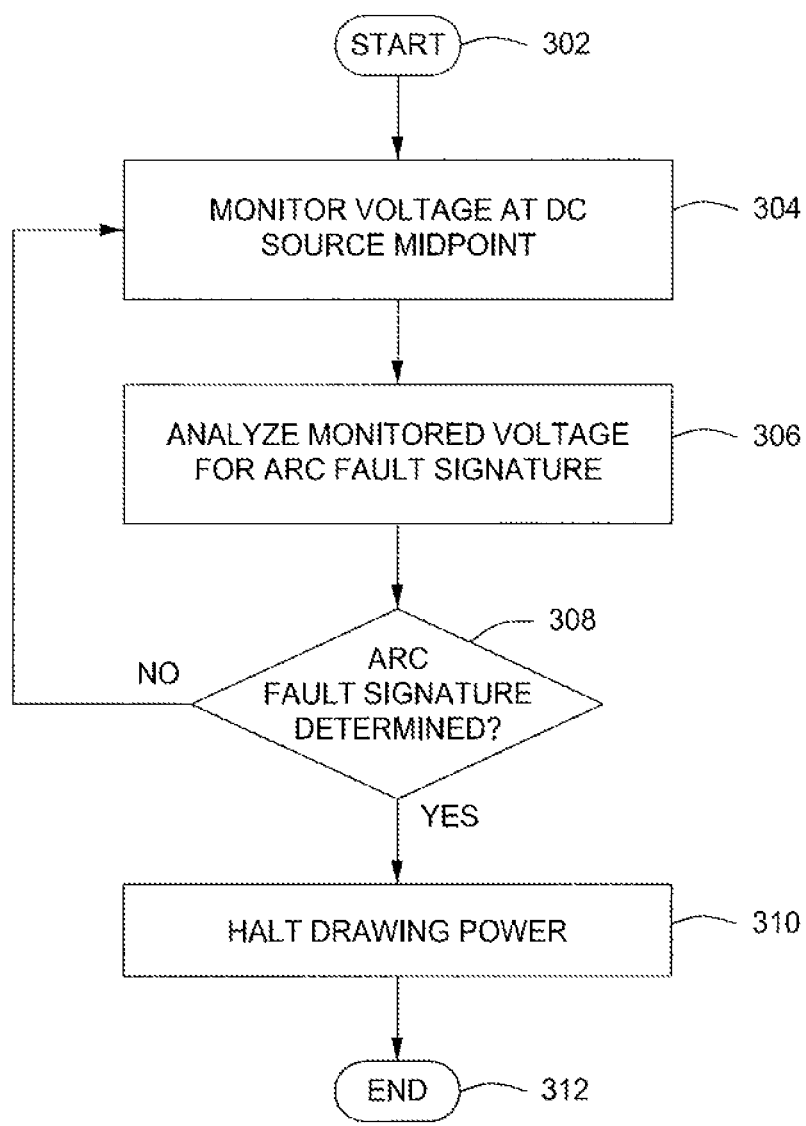
FIG. 3 is a flow diagram of a method for arc fault protection in accordance with one or more embodiments of the present invention.

FIG. 3 is a flow diagram of a method 300 for arc fault protection in accordance with one or more embodiments of the present invention. In one or more embodiments of the method 300, first and second DC power sources are serially coupled to one another at the input of a power converter comprising the filter 114 configured as previously described (e.g., the PV modules PVa and PVb and the inverter 102). The power converter may be any type of power converter, such as a DC-AC inverter, a DC-DC converter, an AC-DC converter, or an AC-AC converter. The method 300 comprises an implementation of the arc fault protection module 182.

The method 300 starts at step 302 and proceeds to step 304. At step 304, the voltage at the midpoint junction of the DC power sources is monitored, for example as by the voltage monitor 112. At step 306, the monitored voltage is analyzed for an arc fault signature (i.e., a sudden change in voltage) that indicates an arc fault. The method 300 proceeds to step 308, where a determination is made whether the monitored voltage exhibits the arc fault signature. If, at step 308, the result of the determination is that the monitored voltage does not exhibit the arc fault signature, the method 300 returns to step 304.

If, at step 308, the result of the determination is that the monitored voltage does exhibit the arc fault signature, the method 300 proceeds to step 310. At step 310, the power converter halts drawing power from the DC power sources; for example, a controller of the power converter (e.g., the controller 106) may issue a command for the power converter to stop drawing power from the DC sources. The method 300 then proceeds to step 312 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for arc fault protection during power conversion, comprising:
   a power converter comprising:
      a first pair of DC input terminals for coupling to a first DC source;
      a second pair of DC input terminals, coupled in series to the first pair of DC input terminals, for coupling to a second DC source;
      an input bridge;
      an inductor;
      a first arc fault protection capacitor; and
      a second arc fault protection capacitor, wherein (i) the series combination of the first and the second pair of DC input terminals is coupled across the input bridge, (ii) a first terminal of the inductor is coupled between the first pair of DC input terminals and the second pair of DC input terminals, (iii) a second terminal of the inductor is coupled between switches on one leg of the input bridge, (iv) the first arc fault protection capacitor is coupled across the first pair of DC input terminals, and (v) the second arc fault protection capacitor is coupled across the second pair of DC input terminals.

2. The apparatus of claim 1, wherein the power converter is a DC-AC inverter.

3. The apparatus of claim 1, wherein the power converter is a DC-DC converter.

4. The apparatus of claim 1, wherein the first and the second arc fault protection capacitors are sized based on an (a) expected inherent inductance in a circuit between the first and the second DC sources and the power converter, and (b) an expected amount of current.

5. The apparatus of claim 1 wherein each of the first and the second arc fault protection capacitors is on the order of tens to hundreds of nanofarads.

6. The apparatus of claim 1, wherein the power converter further comprises an arc fault protection module for determining whether a voltage at a midpoint junction between the first and the second DC sources exhibits an arc fault signature and, when the voltage exhibits the arc fault signature, commanding the power converter to halt drawing power from the first and the second DC sources.

7. A system for arc fault protection during power conversion, comprising:
   a first DC source;
   a second DC source;
   a power converter comprising:
      a first pair of DC input terminals coupled in series to a second pair of DC input terminals, wherein the first pair of DC input terminals are coupled to the first DC source and the second pair of DC input terminals are coupled to the second DC source;
      an input bridge coupled across the series combination of the first and the second pair of DC input terminals; and
      an inductor wherein a first terminal of the inductor is coupled between the first and the second pair of DC input terminals, and a second terminal of the inductor is coupled between switches on one leg of the input bridge;
   a first arc fault protection capacitor; and
   a second arc fault protection capacitor, wherein the first arc fault protection capacitor is coupled across the first pair of DC input terminals, and the second arc fault protection capacitor is coupled across the second pair of DC input terminals.

8. The system of claim 7, wherein the power converter is a DC-AC inverter.

9. The system of claim 7, wherein the power converter is a DC-DC converter.

10. The system of claim 7, wherein the first and the second arc fault protection capacitors are sized based on an (a) expected inherent inductance in a circuit between the first and the second DC sources and the power converter, and (b) an expected amount of current.

11. The system of claim 7, wherein each of the first and the second arc fault protection capacitors is on the order of tens to hundreds of nanofarads.

12. The system of claim 7, wherein the first and the second arc fault protection capacitors are within the power converter.

13. The system of claim 7, wherein the first and the second arc fault protection capacitors are external to the power converter.

14. The system of claim 7, wherein the first and the second arc fault protection capacitors are coupled across the first and the second DC sources, respectively, at the first and the second DC sources.

15. The system of claim 7, wherein the first and the second DC sources are photovoltaic (PV) modules.

16. The system of claim 15, wherein the first arc fault protection capacitor is within a PV module junction box of the first DC source, and the second arc fault protection capacitor is within a PV module junction box of the second DC source.

17. The system of claim 7, wherein the power converter is a centralized power converter in a distributed generator (DG).

18. The system of claim 17, wherein the DG comprises a PV array coupled to the power converter.

19. The system of claim 7, wherein the power converter is coupled to a first string of DC sources and to a second string of DC sources, wherein the first string of DC sources comprises the first DC source, and wherein the second string of DC sources comprises the second DC source.

20. The system of claim 7, wherein the power converter further comprises an arc fault protection module for determining whether a voltage at a midpoint junction between the first and the second DC sources exhibits an arc fault signature and, when the voltage exhibits the arc fault signature, commanding the power converter to halt drawing power from the first and the second DC sources.

* * * * *